United States Patent
Nolan et al.

(10) Patent No.: US 10,178,740 B2
(45) Date of Patent: Jan. 8, 2019

(54) ROAD LIGHTING

(71) Applicant: PHILIPS LIGHTING HOLDING B.V., Eindhoven (NL)

(72) Inventors: Julian Charles Nolan, Pully (CH); Matthew John Lawrenson, Bussigny-Pres-De-Lausanne (CH); Alexander Henricus Waltherus Van Eeuwijk, Eindhoven (NL); Hilbrand Vanden Wyngaert, Grobbendonk (BE); Huon Urbald Ogier Norbert Van De Laarschot, Eindhoven (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days.

(21) Appl. No.: 15/548,047

(22) PCT Filed: Jan. 21, 2016

(86) PCT No.: PCT/EP2016/051218
§ 371 (c)(1),
(2) Date: Aug. 1, 2017

(87) PCT Pub. No.: WO2016/124409
PCT Pub. Date: Aug. 11, 2016

(65) Prior Publication Data
US 2018/0020527 A1    Jan. 18, 2018

(30) Foreign Application Priority Data
Feb. 5, 2015 (EP) .................................. 15154000

(51) Int. Cl.
*H05B 37/02*    (2006.01)

(52) U.S. Cl.
CPC ..... *H05B 37/0227* (2013.01); *H05B 37/0245* (2013.01)

(58) Field of Classification Search
CPC .................. H05B 37/0227; H05B 37/0245
USPC ......................................................... 315/152
See application file for complete search history.

(56) References Cited

U.S. PATENT DOCUMENTS

| | | |
|---|---|---|
| 5,764,163 A | 6/1998 | Waldman et al. |
| 6,614,536 B1 | 9/2003 | Doemens et al. |
| 2003/0189500 A1 | 10/2003 | Lim |
| 2011/1003647 | 5/2011 | Leopold et al. |
| 2012/0074842 A1 | 3/2012 | Hattori et al. |

(Continued)

FOREIGN PATENT DOCUMENTS

| | | |
|---|---|---|
| JP | 05109305 A | 4/1993 |
| JP | 2001307895 A | 11/2001 |

(Continued)

*Primary Examiner* — Don Le (57) ABSTRACT

A system comprising: one or more road-side illumination sources arranged to emit illumination to illuminate at least part of a road; one or more detectors arranged to detect a value of one or more parameters of a vehicle travelling on this road or this part of the road, the one or more parameters comprising a type of the vehicle and/or an identity of one or more users of the vehicle; and a controller arranged to control the illumination emitted by the one or more illumination sources, wherein the controller is configured to adapt the illumination in dependence on the detected value or values of the one or more detected parameters.

12 Claims, 1 Drawing Sheet

(56) References Cited

U.S. PATENT DOCUMENTS

| | | | |
|---|---|---|---|
| 2013/0229518 A1* | 9/2013 | Reed | H05B 37/0227 |
| | | | 348/148 |
| 2014/0085475 A1* | 3/2014 | Bhanu | G06K 9/00825 |
| | | | 348/148 |
| 2014/0232566 A1* | 8/2014 | Mimeault | G01S 17/023 |
| | | | 340/935 |
| 2015/0149019 A1* | 5/2015 | Pilutti | G08G 1/22 |
| | | | 701/23 |
| 2015/0269444 A1* | 9/2015 | Lameyre | G06K 9/00785 |
| | | | 382/104 |
| 2016/0247394 A1* | 8/2016 | Stenneth | G08G 1/0112 |
| 2018/0056851 A1* | 3/2018 | Kim | B60Q 1/085 |
| 2018/0075747 A1* | 3/2018 | Pahwa | G08G 1/164 |

FOREIGN PATENT DOCUMENTS

| | | |
|---|---|---|
| WO | 2009003279 A1 | 1/2009 |
| WO | 2014147524 A1 | 9/2014 |
| WO | 2014181369 A1 | 11/2014 |

* cited by examiner

ROAD LIGHTING

CROSS-REFERENCE TO PRIOR APPLICATIONS

This application is the U.S. National Phase application under 35 U.S.C. § 371 of International Application No. PCT/EP2016/051218, filed on Jan. 21, 2016 which claims the benefit of European Patent Application No. 15154000.2, filed on Feb. 5, 2015. These applications are hereby incorporated by reference herein.

TECHNICAL FIELD

The present disclosure relates to the control of an illumination source for illuminating a road being traveled by a vehicle.

BACKGROUND

Electric road lighting has traditionally been provided through the use of high-intensity discharge lamps, often based on high-pressure sodium lamps. Such lamps are either centrally controlled, or controlled by local photosensitive sensors and are effectively either on or off. More recently new street lighting technologies have been introduced based on LEDs. Such lamps can offer a higher degree of control, and may be individually controlled in terms of brightness, wavelength of light used, etc.

Traditional street lighting is typically homogenous within a given area, and does not adapt to changing conditions or requirements within the area in the proximity of the lamp. However more recently, as well as providing illumination, so-called 'smart streetlights' may offer other functionality based on communication or sensor technology, such as the ability to track vehicles, communicate with other lights, vehicles or a central system. They may also contain intelligence to modify their operation based on events in their location.

SUMMARY

Nonetheless, current solutions do not take into account different vehicle requirements, e.g. preferences associated with a given physical form of the vehicle such as whether the vehicle is a car, lorry or motorcycle, etc., or requirements of sensing components of automated vehicles.

Some solutions do exist whereby street lighting is modified when the presence of a vehicle is detected within a certain range, or the vehicle is detected to be at a certain speed (e.g. a warning light may be lit if a vehicle is above a certain speed). However such systems adapt their lighting only based on extrinsic motion-related variables of the vehicle (in this case speed or position) and not on inherent or internal properties of the vehicle itself, such as a vehicle type or preferences associated with the vehicle or its users.

According to one aspect disclosed herein, there is provided a system comprising: one or more road-side illumination sources arranged to emit illumination to illuminate at least part of a road; and one or more detectors arranged to detect a value of one or more parameters of a vehicle travelling on said road or said part of the road, the one or more parameters comprising a type of the vehicle and/or an attribute of one or more users of the vehicle. The system further comprises a controller arranged to control the illumination emitted by the one or more illumination sources, wherein the controller is configured to adapt said illumination in dependence on the detected value or values of said one or more parameters.

In embodiments, the controller may be configured to access a database mapping one or more respective illumination settings to each of a plurality of potential detected values for each of said one or more parameters, or to each of a plurality of potential combinations of detected values of said parameters. In this case the controller may be configured to perform said adaptation by looking up the one or more respective illumination settings mapped to the one or more detected values in the database, and adapting the illumination accordingly.

In embodiments, one or more of the illumination settings in said database may be user preferences settable by one of the one or more users of the vehicle (e.g. the driver). Alternatively or additionally, one or more of the illumination settings in said database may be set by an operator of the system or a manufacturer of the vehicle.

As an example, the one or more detected parameters may comprise at least a body type of the vehicle, the value of the body type being detected from amongst a set comprising two or more of: car, van, lorry, bus, motorcycle, and/or bicycle.

As another example, the one or more detected parameters may comprise at least a propulsion type of the vehicle, the value of the propulsion type being detected from amongst a set comprising two or more of: petroleum-based, electric, fuel-cell, hybrid of petroleum-based and electric, hybrid of petroleum-based and fuel-cell, and hybrid of electric and fuel-cell.

As yet another example, the one or more detected parameters may comprise at least a detection a control type of the vehicle, the value of the control type being detected from amongst a set comprising two or more of: manually driven vehicle, assisted (partially autonomous), and/or autonomous vehicle. E.g. the controller may be configured to apply one or more illumination settings designed for an artificial light or image sensor of the vehicle in case of detecting that the vehicle is an autonomous vehicle, and to apply one or more illumination settings designed for the human visual system in case of detecting that the vehicle is a manually controlled vehicle.

In embodiments, said attribute of the one or more users may comprise an identity of the one or more users (e.g. the driver or owner). In embodiments, the parameters being detected may comprise both the type of the vehicle and the identity of the one or more users.

In embodiments, said attribute of the one or more users may comprise a user preference of the one or more users, being communicated from the vehicle to be detected by one of the one or more detectors (as opposed to or in addition to the user preference being looked up based on a detected type of the vehicle and/or identity of the one or more users).

In embodiments, the controller may be configured to adapt the illumination in further dependence on one or more motion-related variables of the vehicle. For instance the motion-related variables comprise a position of the vehicle (e.g. range from the detector), and/or a speed or velocity of the vehicle.

In further embodiments, the controller may be configured to adapt the illumination in further dependence an environment of said road or said part of the road.

In yet further embodiments, the controller may be configured to detect respective values of said one or more parameters for two or more different vehicles travelling on said road or said part of the road and, for each of the two or more vehicles, to determine a respective one or more illumination settings for said illumination based on the detected value or values of the respective one or more settings; and the controller may be further configured to apply an arbitration process to arbitrate between the settings determined for the different vehicles, to thereby determine one or more illumination settings to apply to perform said adaptation of the illumination. For example, the parameters based on which the settings are determined may be placed into different categories, e.g. a setting specified by a user preference may fall in the category of aesthetics, whereas a setting for a vehicle type may fall in the category of safety. These categories may be ranked according to priority, e.g. safety ranks higher than aesthetics. The arbitration process may then comprise selecting, from amongst conflicting settings for the same illumination property (such as dim level, spectrum or direction), only the setting resulting from the highest ranked category. Alternatively the arbitration process may comprise selecting a compromise (e.g. average) between the two conflicting settings for the illumination property in question (optionally weighted based on the ranking if the settings fall in different categories). E.g. if a first vehicle requests a dim level of 70% and a second requests 90%, the controller may choose 80% if both are pure user preferences, or perhaps 85% if the second vehicle's dim level was actually a safety level determined for that vehicle's type while the first vehicle was merely requesting a preference.

According to another aspect disclosed herein, there may be provided a method comprising: using one or more road-side illumination sources to emit illumination to illuminate at least part of a road; detecting a value of one or more parameters of a vehicle travelling on said road or said part of the road, the one or more parameters comprising a type of the vehicle and/or an attribute of one or more users of the vehicle; and controlling the illumination emitted by the one or more illumination sources, said control comprising adapting said illumination in dependence on the detected value or values of said one or more parameters.

According to yet another aspect disclosed herein, there may be provided a computer program product for controlling one or more road-side illumination sources to emit illumination to illuminate at least part of a road, the computer program product comprising code embodied on a computer-readable storage medium and configured so as when run on a controller to perform operations of: using one or more detectors to detect a value of one or more parameters of a vehicle travelling on said road or said part of the road, the one or more parameters comprising a type of the vehicle and/or an attribute of one or more users of the vehicle; and controlling the illumination emitted by the one or more illumination sources, said control comprising adapting said illumination in dependence on the detected value or values of said one or more parameters.

In embodiments the method may comprise, and/or the computer program may be configured to perform, further operations in accordance with any of the system features disclosed herein.

BRIEF DESCRIPTION OF THE DRAWINGS

To assist the understanding of the present disclosure and to show how embodiments may be put into effect, reference is made by way of example to the accompanying drawings in which.

DETAILED DESCRIPTION OF PREFERRED EMBODIMENTS

Figure 1:
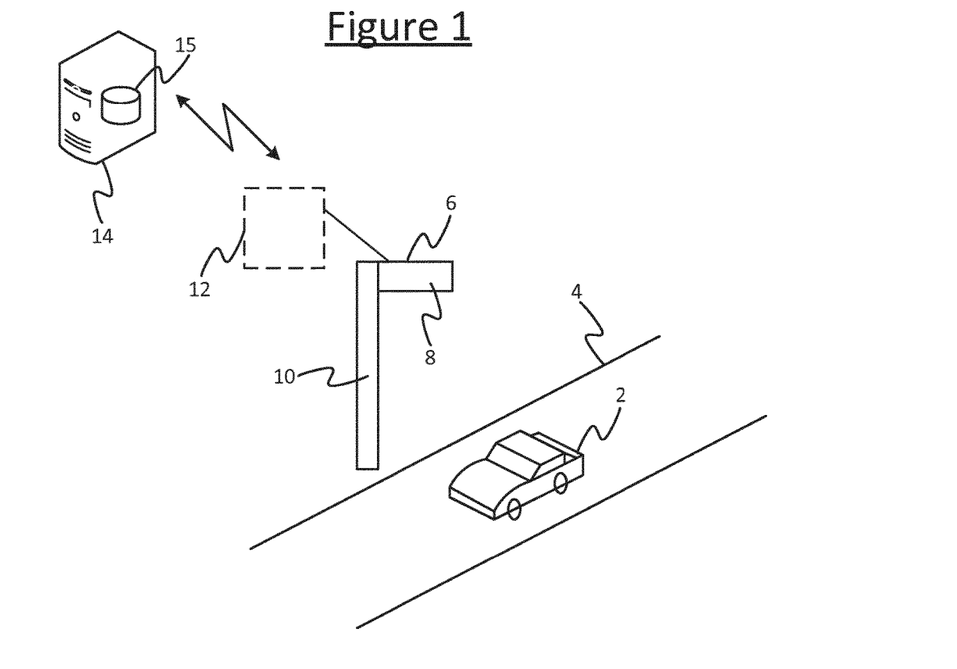
FIG. 1 is a schematic illustration of a lighting system for illuminating a road.

FIG. 1 shows an example of a road lighting system in accordance with embodiments of the present disclosure. The system comprises one or more road-side illumination sources 6 disposed along a road 4 that is to be traveled by a vehicle 2. The road-side illumination sources 6 may be fixed or may be temporary free-standing units. They may take the form of light poles installed along edges of the road, or may be suspended above the road by a gantry or such like, or any combination of these. Each illumination source 6 comprises at least one respective luminaire 8 mounted or otherwise directed so as to illuminate a respective part of the road 4. For example in the case of a light pole, the luminaire 8 is mounted on a pole 10 and arranged to shine down onto the road 2, or the light source 6 may even comprise a pair of luminaires 6 mounted either side of the pole 10 so as to illuminate opposite sides of the road (for traffic in opposite directions).

To illuminate the road 4 means providing a substantive contribution towards the light that enables the vehicle 2 to navigate the road. Signaling lights such as traffic lights, dot-matrix signs or pure road-markings are not considered to provide illumination for the purposes of the present disclosure, as they do not flood the relevant part of the road with light so as to make the road ahead and its contents visible to the human or automatic driver, and so are not adequate to allow a human or automatic driver to both safely find its way along the road and avoid unexpected obstacles.

Each of the illumination sources 6 is arranged to be serviced by control apparatus 12. Some or all of the components of the control apparatus 12 may at least partially be centralized, i.e. common to some or all of the illumination sources 6. Alternatively each of the one or more illumination sources 6 could be provided with its own respective instance of some or all of the components of the control apparatus 12, or some components could be common to multiple illumination sources while others are provided per illumination source 6 (see discussion below in relation to FIG. 2).

In embodiments, the control apparatus 12 is also arranged to access to a database 15 of illumination settings for the one or more illumination sources controlled by the control apparatus 12. This database 15 may be hosted on a server 14 comprising one or more server units at one or more sites, and accessed by the control apparatus 12 over a wired or wireless local or wide area network or internetwork. Alternatively the database 15 may be implemented in a local memory of the control apparatus 12.

Figure 2:
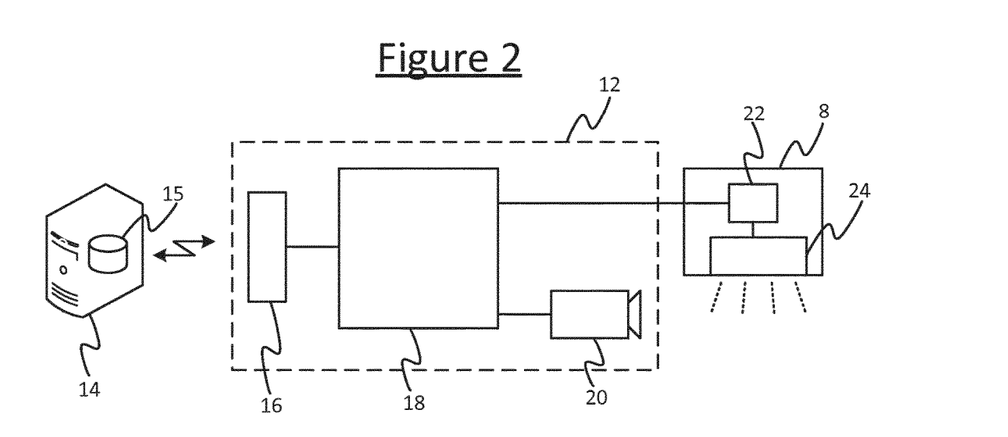
FIG. 2 is a schematic block diagram of an illumination system or illuminating a road.

FIG. 2 shows more detail of the control apparatus 12, and the luminaire 8 of the illumination source 6.

The luminaire 8 comprises a lamp (lighting element) 24 and a driver 22 connected to drive the lamp 24. In embodiments the lamp 24 of each of the illumination sources 6 comprises a string or array of LEDs. However, while LEDs are preferred for their controllability, it is not excluded that the lamp 24 of some or all of the illumination sources 6 could take another form such as an incandescent bulb or gas discharge lamp.

The control apparatus 12 comprises a controller 18 and one or more detectors 20. The controller 18 is connected to control the lamp 24 via the driver 22, in order to control one or more properties of the illumination emitted by the lamp 24, such as the dimming level and/or colour (spectrum) of the emitted illumination. The controller 18 may take the form of software stored on a memory (compromising one or more memory devices employing one or more storage media) and arranged to be executed on a processor (comprising one or more processing units). Alternatively a dedicated hardware implementation, or a combination of software and hardware, are not excluded. The controller 18 may be integrated in the luminaire 8, or external to the luminaire 8 but mounted on the same pole 10 or supporting structure, or may be implemented in separate unit nearby or remote to the illumination source 6. In the case of an external or separate controller 8, this may be connected to the driver 22 by a direct (non-networked) wired or wireless connection, or via a local wired or wireless network, or a wired or wireless wide area network or internetwork. For example, illumination sources 6 may be part of a local wired network and/or local wireless network (e.g. based on a short-range RF technology such as Wi-Fi or ZigBee network) and the controller 18 may be connected to the illumination sources 6 via this local network, either being part of the same local network or connecting to it remotely via a wired or wireless wide area network or internetwork, such as the Internet or a cellular mobile phone network (e.g. 3GPP network). Another possibility is that no local network is involved per se, and each illumination source 6 connects individually to the control apparatus, e.g. via an individual direct connection or an individual connection over the Internet of cell phone network (or other such wide-area network or internetwork).

In the case where the database 15 is implemented on a server 14, the server 14 may be part of the same wired or wireless local network as the illumination sources 6, controller 18 and/or detector 20, and the controller 18 may connect to it via the local network or may be implemented on the server 14 itself. Alternatively the server 14 may be situated remotely from the controller 18 and/or illumination sources 6, and the controller 18 may connect to it via a wired or wireless wide area network or internetwork, e.g. again such as the Internet or cellular mobile phone network. As yet another alternative, the database 15 may be implemented locally at the controller 18 in a memory of the controller 18. Note also that all of the database 15 need not necessarily be implemented in the same place, and it is not precluded that some of the database may be implemented in the server 14 while another part of the database 15 is implemented in local memory of the controller 18.

The one or more detectors 20 comprise at least one detector for detecting at least one parameter of the vehicle 2, i.e. a property relating to the intrinsic nature of the vehicle itself, or to its internal contents or load such as or one more of its users. In the case of detecting multiple such parameters, a given one of the one or more detectors 20 may be arranged to detect more than one parameter, and/or more than one detector 20 may each detect a respective parameter. Each of the one or more detectors 20 comprises at least some front-end sensor hardware in the form of one or more transducers, and may also comprise associated software stored on a memory and arranged for execution on a processor (either the same memory and/or processor as the controller 18, or a different memory and/or processor).

A parameter of a vehicle means a static property of the vehicle or one or more of its users, i.e. a parameter of the vehicle is a property which, for a given configuration or composition of the vehicle and a given set of passengers, property does not change with the vehicle's motion. The position and speed of the vehicle on the other hand are considered variables as these vary in an ongoing fashion as the vehicle drives or moves about, i.e. varying continuously throughout the journey. That is, parameters are constant with motion, at least for a given journey portion in between modifications to the configuration of the vehicle (e.g. its structure is modified or its software updated), and/or between dropping off or picking up passengers, or changing drivers.

In embodiments, the one or more parameters which the one or more detectors 20 are configured to detect comprise a type of the vehicle 2: e.g. whether it is classified as a car, bus, lorry, motorcycle or (pedaled) bicycle; whether it is powered by a petroleum based fuel, electric battery, fuel cell or a hybrid of any of these; and/or whether it is a manually driven vehicle, an autonomous (automatically driven) vehicle, or an assisted vehicle being a hybrid of these. For example, the detector(s) 20 may comprise one or more 2D and/or depth-aware (ranging) cameras plus an image recognition algorithm arranged to detect one or more of these parameters from the physical shape of the vehicle and/or information such as text displayed on the vehicle 2, and/or the detector(s) 20 may comprise a wireless receiver arranged to receive a data signal from a transmitter onboard the passing vehicle 2 indicating such information (either explicitly or by means of an ID which the detector 20 may look up).

Alternatively or additionally, the one or more parameters which the one or more detectors 20 are configured to detect may comprise an identity of one or more of the users of the vehicle. A user of a vehicle could be a driver, passenger, or owner of the vehicle. Note that the driver as referred to herein means the user controlling the motion of the vehicle (so e.g. in case of a bicycle the rider may be considered the "driver" for the purposes herein). The identity of the user may be detected in terms of a name, home address, license plate, and/or a unique ID number or string (e.g. email address, or a dedicated number or string such as a username allocated for use in the illumination system). For example, the detector(s) 20 may comprise one or more 2D and/or depth-aware (ranging) cameras plus an image recognition algorithm arranged to detect the user's identity based on facial recognition or reading the license plate, and/or a wireless receiver arranged to receive a data signal from a transmitter onboard the passing vehicle 2 or user device of the user indicating such information. If both vehicle type and user identity are to be detected, the one or more detectors 20 used to detect user identity may be the same one or more of the one or more detectors 20 as used to detect vehicle type, and/or may comprise one or more different detectors.

As another alternative or additional possibility, the one or more parameters which the one or more detectors 20 are configured to detect may comprise a user preference of one or more users of the vehicle 2 (e.g. the driver or owner), the preference(s) being transmitted directly from a transmitter onboard the vehicle 2 and detected by one of the one or more detectors 20. In this case the detector 20 in question comprises a wireless receiver arranged to receive a data signal from the vehicle, communicating the relevant preference(s). This may be a same receiver as used to receive the vehicle type and/or user identity (if used and detected in this manner), or a separate receiver.

In embodiments, the one or more detectors 20 may comprise at least one detector arranged to detect one or more additional factors, in addition to the one or more parameters of the vehicle 2. For instance, the one or more additional factors being detected may comprise one or more motion-related variables, e.g. position, orientation, direction of travel, speed, velocity, acceleration, or magnitude of acceleration, or even a differential of acceleration. For instance the one or more detectors 20 may detect the position of the vehicle 2 in terms of the range of the vehicle relative to the relevant detector(s) 20 or one of the illumination source 6, and/or the one or more detectors 20 may detect the speed and/or direction of travel of the vehicle 2. The detector(s) 20 doing this may comprise one or more 2D or depth-aware cameras with image-recognition algorithm, and/or one or more ranging or motion-detection sensors such as an active ultrasound sensor or radar. The motion-related factors may be detected by a same one or more of the one or more detectors 20 as used to detect the vehicle parameters and/or user identity, and/or a different one or more of the detectors.

Alternatively or additionally, the one or more additional factors may comprise one or more environmental factors, such as weather-type, ambient light-level, and/or another measure of visibility. E.g. the detector(s) 20 doing this may comprise one or more 2D or depth-aware cameras with image-recognition algorithm, and/or one or more dedicated environmental sensors such as a barometer, moisture sensor, ambient light sensor, etc. The environmental factors may be detected by a same one or more of the one or more detectors 20 as used to detect the vehicle parameters, user identity and/or motion-related variable(s), and/or may be detected by a different one or more of the detectors.

One, some or all of the one or more detectors 20 may be integrated into the same unit as the controller 18; and/or one, some or all of them may be implemented in separate units. For example if separate, then one, some or all of the detectors 20 may be integrated into the luminaire 8 of one of the illumination sources 6 along with the controller 18; or may be integrated into the luminaire 8 while the controller 18 is external but mounted on the same pole 10 or supporting structure or otherwise and located nearby, and arranged to receive the input from the detector(s) 20 via a direct wired or wireless connection, or a wired and/or wireless local network; or the detector(s) 20 in question could be integrated into the luminaire 8 while the controller 18 is remote (e.g. on a server 14) and arranged to receive the input from the detectors(s) 20 via a wide area network or internetwork such as the Internet and/or a cell phone network. In another example, one some or all of the detectors 20 may be external to the luminaire 8 but mounted on the same pole or structure, or be substantially co-located. In such cases, the controller 18 could be internal to the luminaire 8, or also mounted on the same pole 10 or supporting structure or be otherwise located nearby, and connected to receive the input from the detector(s) 20 in question via a direct wired or wireless connection, or a wired and/or wireless local network; or the controller 18 could again be remote and arranged to receive the input from the detectors(s) 20 via a wide area network or internetwork such as the Internet and/or a cell phone network. Note also that the functionality of any given one of the one or more sensors 20 could itself be distributed between different units or sites: e.g. a camera or a sensor's transducer may be integrated in the luminaire 8 or mounted on the same pole 10 or supporting structure, or be otherwise co-located with the illumination source 6, while the image recognition algorithm or the processing of the sensor output could be implemented in a separate unit, e.g. on the same server 14 or processor as the controller 18, whether local or remote.

By way of illustration, FIGS. 1 and 2 show an example in which the controller 18 and detector(s) 20 are substantially co-located with an illumination source 6, e.g. being mounted on the same pole 10 or other such supporting structure, and connected to one another by direct wired or wireless links or via a local wired or wireless network (e.g. Wi-Fi); while the database 15 is hosted on a remote server 14 and the apparatus 12 comprises a modem 16 (e.g. integrated in the same unit as the controller 18 or a separate unit on the same local network), the modem 16 being arranged to enable the controller 18 to access the database 15 via a wide-area network or internetwork such as the Internet or a cell phone network (e.g. 3GPP network). However, it will be appreciated that this is not limiting.

By whatever means the components 14, 15, 18, 20 are connected, the controller 18 is arranged to receive the detection results in the form of the one or more vehicle parameters, and optionally the one or more motion-related variables and/or environmental factors, as an input from the relevant one or more detectors 20. The controller 18 is configured to process these results (in software and/or hardware) and, based thereon, to adapt one or more properties of the illumination being emitted by the one or more illumination sources 6 that it is arranged to control. The controlled properties may for example comprise the dim level, the colour (spectrum), a direction of the illumination (if not omnidirectional, e.g. if a beam) and/or the timing of a dynamic illumination effect. The controller 18 determines the settings to apply for these properties by looking them up in the database 15 based on the one or more detected parameters (vehicle type and/or user identity), and optionally also based on the one or more motion-relation variables and/or environmental factors). Alternatively or additionally, the controller 18 may receive user preferences for these settings communicated directly from a data transmitter included onboard the vehicle 2.

Thus there is provided a system whereby various desired lighting preferences, including those pertaining to the environment surrounding a road, the vehicles driving on a road and the occupants within those vehicles, can be taken into account and an overall lighting preference established based thereon. The lighting preferences of a vehicle 2 may include those that provide best visibility from a safety perspective, provide a pleasant ambience to the vehicle occupants, or provide the lighting conditions that allow various sensors on the vehicles (for example those controlling an autonomous vehicle) to work. Also, as different sensors may be used to detect objects at differing ranges, the vehicle's lighting preference may change as a function of distance from the vehicle. The lighting preferences of one or more vehicles within a given area are established either via direct communication between the system and vehicles 2, or by sensing properties of the vehicles 2 and then using lookup tables 15 to ascertain the most likely preferences. In embodiments, where a lighting preference that suits all road users cannot be found, an arbitration may be performed using ranked categories (for example with safety ranking more highly than vehicle occupant preferences).

Some exemplary applications of this system are now described in more detail.

In embodiments, the system is configured to adapt the road lighting to different vehicle types. Vehicles are available in numerous forms, for example bicycles, mopeds, motorbikes, cars, vans, buses, lorries, etc. It may also be the case that sub-categories exist; for example to distinguish between pedal-powered bicycles, electric cycles and mopeds; or mini-buses and vans. Each vehicle form may have a different optimal lighting preference, both from the point of view of the occupants and other users. Examples may be as follows.

(a) The driver of a lorry might prefer the street lighting to have a different angle of emission from the lamp as they are seated further from the road compared to a car driver.

(b) A bicycle user may wish for the lights to be brighter as they are smaller and more difficult to see than other vehicles.
(c) A bus passenger might wish the area to the side of the road to be illuminated, as they would like to view passing scenery.
(d) A particular type of paint may be used whereby detailing is highlighted when illuminated by light with a certain wavelength.

As well as form, vehicles typically fall into a set of other well-defined categories. For example a vehicle's propulsion may be categorized as petroleum-based, electric, fuel cell or hybrids of these. The form of control of a vehicle may also be categorized as either human-driven, human assisted by technology, or autonomous. Each vehicle category might have a different optimal lighting condition. Examples may be as follows.
(a) Human-driven cars require a very bright visible light in front of the driver at night, as the driver needs to see well.
(b) An autonomous car might not rely on visible light, and in fact might project its own light source so any external light source may be undesirable as it could reduce the signal-to-noise ratio of the vehicle's own sensors. Further to this an autonomous vehicle typically relies on multiple types of sensor—with each potentially having a different optimal lighting condition. For example an autonomous vehicle may simultaneously use LIDAR (light or laser "radar") and computer vision, and the LIDAR based sensor may work better when ambient light is low, as its own laser light can be more readily detected, whilst the computer vision technique may work better when the ambient light is brighter. As different sensors may be used to detect objects at different distances the preferred lighting settings may vary as a function of distance from the vehicle.

Note that the terms manual, assisted and autonomous as used herein refer to the high level decision making process of navigation, i.e. controlling the speed and direction of the vehicle in real-time in order to take a desired route or reach a desired destination, and to follow traffic flow rules and deal with unexpected obstacles (not to lower level automated functions such as changing gear, cruise control, engine management or anti-braking systems which nowadays are often included in manually driven vehicles—though it is not excluded that the illumination system could alternatively or additionally detect whether or not the vehicle 2 is equipped with one or more such automated control sub-systems and adapt the illumination in dependence on this).

As can be seen from the above text, there are potentially many different lighting preferences amongst vehicles, based on their form, usage and class. When vehicles with a mixture of forms and classes use the same road, a fixed, homogeneous road lighting system will be unable to satisfy all these differing lighting preferences.

According to embodiments disclosed herein on the other hand, the preference of road users, including vehicle owners, drivers and/or occupants, and potentially even other people in the vicinity of the road, are considered when setting the properties of the street lighting; and in embodiments, where requirements are competing an arbitration method may be used to find the best overall lighting setting.

The technique may be implemented as follows.
(i) A baseline environmental lighting preference is prescribed, e.g. in database 15 or as an intrinsic setting of the controller 18.
(ii) The controller 18 determines the location and preference of each vehicle 2 (including occupants) based on the detector(s) 20.
(iii) The controller 18 determines distance between individual vehicles 2 and an individual street lamp 6.
(iv) The controller 18 then sets the lighting settings for each individual streetlamp 6 in consideration of features (i)-(iii).

In embodiments the lighting system includes a sub-system arranged to determine vehicle position, for example using one or more sensors 20 such as an active ultrasound sensor, radar or a light-based ranging sensor, or using a positioning technology such as GPS on the vehicle plus a communication channel to communicate this to the controller 18. The lighting system also includes at least one illumination source 6 with controllable properties (e.g. intensity, colour, direction of the illumination, and/or timing of a dynamic effect), which are set based on one or more lighting settings, being the settings of each illumination source 6 within the lighting system. The system further comprises a temporary vehicle database 15, being a set of stored values pertaining to the lighting preferences associated with a vehicle 2 and the vehicle's current position. The system may also comprise a communication apparatus and protocols to allow the lighting system to communicate with the vehicles 2 (the vehicle communication link). An algorithm on the controller 18 takes the various lighting preferences into consideration and determines the lighting preference. The communication apparatus and protocols also allow the controller 18 to communicate with the illumination sources (the lamp communication link). The database 15 comprises a lookup table containing a categorization of requirements types. Potentially these requirement types are also given a weighting, e.g. safety is given a higher weighting than vehicle detailing.

Examples of requirement types may include: safety preferences (one or more conditions to allow a human to drive safely, and/or to allow a given sensor to operate with required efficacy); environmental preferences (e.g. how drivers would like to see the area they are driving through, and/or how people who live in an area, other than vehicle drivers, use the area, etc.); and/or vehicle detailing preferences (how the vehicle owner would like the vehicle to be lit).

The system may further comprise a sub-system to determine vehicle preference. This could either be done through direct communication with the vehicle via the vehicle communication link, to transfer lighting preferences to the controller 18 in an understandable form, or for cases where such a sub-system does not exist the lighting preferences may be estimated. In order to the make this estimate the system may be augmented with a sub-system comprising apparatus to determine vehicle type, for example using sensors 20 and processing algorithms, and lookup tables in the database 15 containing typical lighting preferences for various types of vehicles. In this case the controller 18 can determine the preference for the vehicle 2 from the lookup table.

The preferences may include one or more environmental lighting preferences, one or more vehicle lighting preferences, and/or one or more vehicle occupant lighting preferences. The environmental preference may be the stipulated lighting preference when no vehicles are present. The vehicle lighting preference may be the lighting preference of the vehicle with regard to operation of the various systems onboard the vehicle 2, such as sensors used in the autonomous guidance system; and/or how the owner of the vehicle wishes it to be seen from the outside. For example a minimum illumination may be required to provide adequate safety coverage, and this may in turn may depend on one or more properties of the vehicle 2 such as its height. The vehicle occupant lighting preferences are the lighting preference of the driver and/or any passengers within the vehicle.

In embodiments the method may proceed as follows. A given controlled area may be allocated a stipulated baseline environmental lighting preference (e.g. as part of a preliminary commissioning stage). For each vehicle 2 entering the controlled area, a temporary vehicle database is then created including: one or more desired vehicle lighting preferences, and/or one or more desired vehicle occupant lighting preferences. This is done either by direct communication with the vehicle 2 via the vehicle communication link, or through use of other sensors 20. In the latter case, one or more properties of the vehicle are sensed (for example it's physical form) and the controller 18 uses the one or more sensed properties and categorizes the vehicle into one of a list of vehicle categories. The controller 18 then determines a preference or set of preferences associated with that vehicle category from the lookup table 15.

In embodiments, the position of each vehicle 2 in the controlled area may also be tracked, with the distance of the vehicle to each illumination source 6 being provided to the controller 18.

Controller 18 takes the environmental preference(s), vehicle lighting preference(s), and/or vehicle occupant lighting preference(s), optionally together with the current location of each vehicle, into consideration and determines the lighting setting that most closely achieves the desired lighting condition in the area of the vehicle 2. An example of how this might be achieved is as follows.

The environmental preference(s), vehicle lighting preference(s), and/or vehicle occupant lighting preference(s) are described in terms of a desired lighting preference (e.g. comprising brightness, light wavelengths, etc.) and an upper and lower tolerable limit. A lighting setting is then found whereby the deviation of lighting condition and desired conditions is minimized. In embodiments, each category in the database 15 may have a ranking (e.g. safety preferences might be ranked more highly than the ambience preferences of a vehicle passenger). Where the lighting at the location of each vehicle 2 lies within the upper and lower tolerable limit, and also within the tolerable limits of the environmental lighting preference, this lighting setting is used. Where this is not achieved, the rankings stipulated in the database 15 are applied, with the preferences associated with the lowest rank being removed and the lighting preference being re-calculated. This is repeated until a lighting setting that falls within the remaining category's tolerance limits is found.

The determined lighting setting is communicated to the illumination sources 6 via the lamp communication link and the illumination sources 6 adopt that setting. The above determination steps are repeated on a regular basis, with a time interval appropriate to the speed of the vehicles (i.e. shorter time intervals if the vehicles are travelling faster).

In further embodiments, the light sources within or onboard the vehicle 2, for example headlamps or interior lamps, may also form part of the system and could be controlled together with the road-side illumination sources 6 to achieve an overall lighting setting.

In yet further embodiments, a payment system could be incorporated into the system whereby users pay to have their lighting preference used.

In a particularly advantageous embodiment of the present disclosure, vehicles travelling along a road are detected, and classified into those which are Autonomous Vehicles (AV) and those which are Manually Driven Vehicles (MDV) by the controller 18. The image sensors in each AV and MDV are characterized according the colour spectrum, intensity and other illumination properties which are required for their operation, and their range. A model is used to characterize the human vision system of the driver of a MDV, who is then regarded as a sensor. Desired static and/or dynamic environmental factors such as street light power consumption, light pollution etc. are determined. Sensing systems including active illumination elements (such as a LIDAR or human vision supported by headlights) are characterized such that the active illumination element is considered as part of the overall sensing system. The lighting properties of street lamps 6 which lie along a route are then geo-spatially controlled such the spatial (range dependent) illumination needs of the sensors of each AV and MDV are met, but constrained according to a defined transfer function linking the AV and/or MDV to the static and/or dynamic environmental factors (e.g. this may be that the lighting reverts to the environmental parameters by default, and only varies from these if required by the sensing needs of the AV and/or MDV).

In the case of multiple vehicles being present on the same region of route at the same time, an arbitration mechanism may be used such that the illumination needs of all vehicles are met, e.g. by using the highest common denominator among the spatial illumination sensing needs of the AV and/or MDV which are present.

The controller 18 may configured to implement an arbitration process whether adapting to AV vs. MDV vehicles and/or adapting to one or more other factors. This process may be arranged to arbitrate between conflicting preferences for a given user (e.g. safety vs. aesthetics), and/or between conflicting preferences of different users such as different vehicles present in a part of the road 4 illuminated by the same illumination source 6.

For instance, if a first vehicle is requesting a light setting based on aesthetic principles, and a second vehicle is requesting a light setting based on safety conditions, the latter may be given priority. In embodiments, this would only be done to the extent that such requested light settings are mutually exclusive. For example, the aesthetic lighting requested to please passengers in the first vehicle could be applied to zones where it does not affect the safety lighting provided for the second vehicle. As a further example, the light setting that would be applied for the first vehicle could be 'dim to 30%' whereas the light setting that would be applied to the second vehicle could be 'maximum brightness'—based on arbitration the light level could be set to 70% to meet any requirements related to the safety aspect yet also accommodate to some extent the request of the first vehicle.

In a further embodiment, the controller 18 may be configured to provide feedback to the first vehicle in the example above to increase the distance to the second vehicle by X meters such that the lighting request can be fully accommodated.

It will be appreciated that the above embodiments have been described only by way of example. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system comprising:
one or more road-side illumination sources arranged to emit illumination to illuminate at least part of a road;
one or more detectors arranged to detect a value of one or more parameters of a vehicle travelling on said road, the one or more parameters comprising a type of the vehicle;
a controller arranged to control the illumination emitted by the one or more illumination sources, wherein the controller is configured to adapt said illumination in dependence on the detected value or values of said one or more parameters, wherein the one or more detected parameters comprise at least a detection of a control type of the vehicle, the value of the control type being detected from amongst a set comprising two or more of: manually driven vehicle, assisted vehicle, and/or autonomous vehicle;
wherein the controller is configured to apply one or more illumination settings designed for an artificial light or image sensor of the vehicle in case of detecting that the vehicle is an autonomous vehicle, and to apply one or more illumination settings designed for the human visual system in case of detecting that the vehicle is a manually controlled vehicle; and,
wherein the one or more parameters further comprises an attribute of one or more users of the vehicle, and wherein said attribute of the one or more users comprises an identity of one or more users of the vehicle.

2. The system of claim 1, wherein the controller is configured to access a database mapping one or more respective illumination settings to each of a plurality of potential detected values for each of said one or more parameters or to each of a plurality of potential combinations of detected values of said parameters, and to perform said adaptation by looking up the one or more respective illumination settings mapped to the one or more detected values in the database and adapting the illumination accordingly.

3. The system of claim 2, wherein one or more of the illumination settings in said database are user preferences settable by one of one or more users of the vehicle.

4. The system of claim 1, wherein the one or more detected parameters comprise at least a body type of the vehicle, the value of the body type being detected from amongst a set comprising two or more of: car, van, lorry, bus, motorcycle, and/or bicycle.

5. The system of claim 1, wherein the detected parameters comprises both the type of the vehicle and the identity of the driver.

6. The system of claim 1, wherein said attribute of the one or more users further comprises a user preference of the one or more users, being communicated from the vehicle to be detected by one of the one or more detectors.

7. The system of claim 1, wherein the controller is configured to adapt the illumination in further dependence on one or more motion-related variables of the vehicle.

8. The system of claim 7, wherein the motion-related variables comprise a position of the vehicle and/or a speed or velocity of the vehicle.

9. The system of claim 1, wherein the controller is configured to adapt the illumination in further dependence an environment of said road or said part of the road.

10. The system of claim 1, wherein:
the controller is configured to detect respective values of said one or more parameters for two or more different vehicles travelling on said road 4 or said part of the road and, for each of the two or more vehicles, to determine a respective one or more illumination settings for said illumination based on the value or values of the respective one or more settings; and
the controller is further configured to apply an arbitration process to arbitrate between the settings determined for the different vehicles, to thereby determine one or more illumination settings to apply to adapt said illumination.

11. A method comprising:
using one or more road-side illumination sources to emit illumination to illuminate at least part of a road;
detecting a value of one or more parameters of a vehicle travelling on said road or said part of the road, the one or more parameters comprising a type of the vehicle;
controlling the illumination emitted by the one or more illumination sources, said control comprising adapting said illumination in dependence on the detected value or values of said one or more parameters, wherein the one or more detected parameters comprise at least a detection of a control type of the vehicle, the value of the control type being detected from amongst a set comprising two or more of: manually driven vehicle, assisted, and/or autonomous vehicle;
wherein the controlling the illumination comprises applying one or more illumination settings designed for an artificial light or image sensor of the vehicle in case of detecting that the vehicle is an autonomous vehicle, and to apply one or more illumination settings designed for the human visual system in case of detecting that the vehicle is a manually controlled vehicle; and,
wherein the one or more parameters further comprises an attribute of one or more users of the vehicle, and wherein said attribute of the one or more users comprises an identity of one or more users of the vehicle.

12. A computer program product for controlling one or more road-side illumination sources to emit illumination to illuminate at least part of a road, the computer program product comprising code embodied on a computer-readable storage medium and configured so as when run on a controller to perform operations of:
using one or more detectors to detect a value of one or more parameters of a vehicle travelling on said road or said part of the road, the one or more parameters comprising a type of the vehicle;
controlling the illumination emitted by the one or more illumination sources, said control comprising adapting said illumination in dependence on the detected value or values of said one or more parameters, wherein the one or more detected parameters comprise at least a detection of a control type of the vehicle, the value of the control type being detected from amongst a set comprising two or more of: manually driven vehicle, assisted, and/or autonomous vehicle;
wherein the controlling the illumination comprises applying one or more illumination settings designed for an artificial light or image sensor of the vehicle in case of detecting that the vehicle is an autonomous vehicle, and to apply one or more illumination settings designed for the human visual system in case of detecting that the vehicle is a manually controlled vehicle; and, wherein the one or more parameters further comprises an attribute of one or more users of the vehicle, and wherein said attribute of the one or more users comprises an identity of one or more users of the vehicle.

\* \* \* \* \*